United States Patent [19]

Steinke

[11] Patent Number: 4,578,239
[45] Date of Patent: Mar. 25, 1986

[54] SPACER FOR FUEL ASSEMBLIES OF WATER-COOLED NUCLEAR REACTORS

[75] Inventor: Alexander Steinke, Ebermannstadt, Fed. Rep. of Germany

[73] Assignee: Kraftwerk Union Aktiengesellschaft, Mülheim, Fed. Rep. of Germany

[21] Appl. No.: 623,631

[22] Filed: Jun. 25, 1984

Related U.S. Application Data

[63] Continuation of Ser. No. 190,983, Sep. 26, 1980, abandoned.

[30] Foreign Application Priority Data

Oct. 11, 1979 [DE] Fed. Rep. of Germany ....... 2941320

[51] Int. Cl.$^4$ ............................................. G21C 3/34
[52] U.S. Cl. .................................. 376/441; 376/438; 376/439; 376/442; 376/462
[58] Field of Search ............... 376/438, 439, 441, 442, 376/462

[56] References Cited

U.S. PATENT DOCUMENTS

| | | | |
|---|---|---|---|
| 3,398,053 | 8/1968 | Huber et al. | 376/442 |
| 3,679,546 | 7/1972 | Muellner et al. | 376/441 |
| 3,679,547 | 7/1972 | Warberg | 376/442 |
| 3,753,855 | 8/1973 | Donck | 376/441 |
| 3,769,159 | 10/1973 | Zinn et al. | 376/438 |
| 3,933,584 | 1/1976 | Litt | 376/439 |

FOREIGN PATENT DOCUMENTS

| | | | |
|---|---|---|---|
| 2102952 | 10/1971 | Fed. Rep. of Germany | 376/441 |
| 2609120 | 9/1976 | Fed. Rep. of Germany | 376/441 |
| 1480965 | 5/1967 | France | 376/441 |
| 2366669 | 4/1978 | France | 376/441 |

Primary Examiner—Deborah L. Kyle
Assistant Examiner—Richard W. Wendtland
Attorney, Agent, or Firm—Herbert L. Lerner; Laurence A. Greenberg

[57] ABSTRACT

Spacer for centering fuel rods of fuel assemblies in water-cooled nuclear reactors, including a grid of sheet metal webs formed of a zirconium alloy and being disposed on edge, rigid bumps formed from at least some of the webs for contacting a fuel rod, at least some of the webs having relatively wide cutouts and relatively narrow lateral slots formed therein, and resilient contact elements formed of chrome nickel steel and having a head part, a base part, a resilient band connecting the head and base parts together into one piece and a bent-out point formed on the resilient band for contacting a fuel rod, the head and base parts of the contact element being insertable into the cutouts and movable into a locked position in the lateral slots formed in the webs.

5 Claims, 12 Drawing Figures

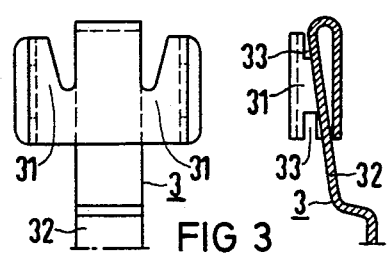
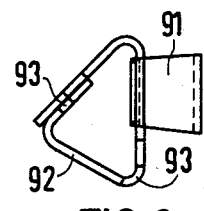
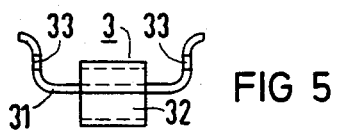
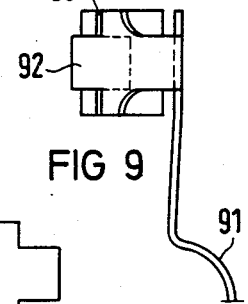
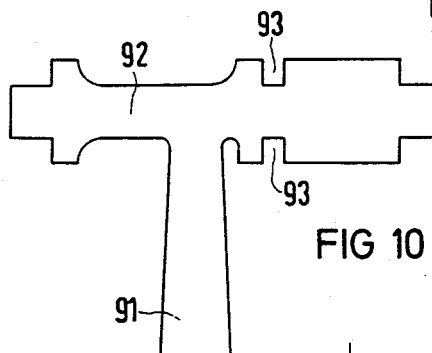
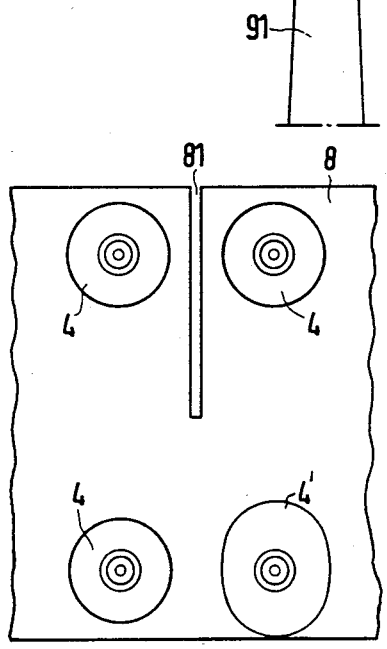
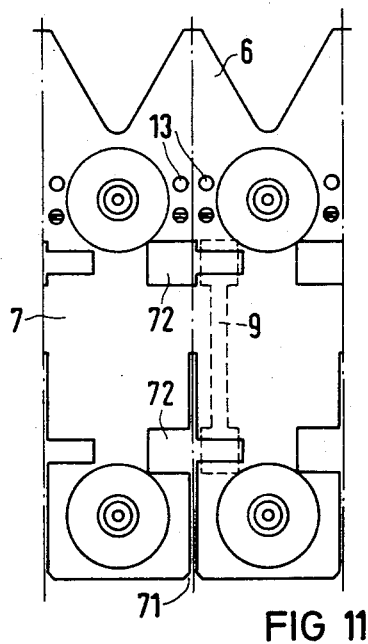

SPACER FOR FUEL ASSEMBLIES OF WATER-COOLED NUCLEAR REACTORS

This is a continuation of application Ser. No. 190,983, filed Sept. 26, 1980, now abandoned.

The present invention relates to a spacer for centering the fuel rods of fuel assemblies in water-cooled nuclear reactors, including a grid of sheet metal webs of a zirconium alloy disposed or standing on edge with rigid contact bumps for the fuel rods formed therefrom and with resilient contact bumps of chrome nickel steel hung into these webs. Such a construction of spacers of different material has already been proposed in various ways. The main purpose of this construction principle is seen in the fact that neutron absorption can be kept as low as possible since, among other things, the degree of enrichment of the nuclear fuel also depends thereon. For the construction of such spacers, different constructions have already become known; reference is made only to German Published, Prosecuted Application DE-AS No. 2 102 952 and German Published, Non-Prosecuted Application DE-OS No. 2 609 120. In both publications the resilient contact bumps are disposed at the crossings of the webs of the spacer grid. They have the shape of a lantern and each extend with one contact spring into the four spacer meshes adjoining this crossing. The disadvantages in this construction are firstly the difficult assembly of the entire spacer and also the relatively large share in the entire spacer structure of the crome nickel steel material which absorbs neutrons more heavily.

It is accordingly an object of the invention to provide a spacer for fuel assemblies of water-cooled nuclear reactors, which overcomes the hereinafore-mentioned disadvantages of the heretofore-known devices of this general type, and to find a spacer construction of relatively simple construction which allows a simple formation of the resilient contact bumps and permits ready assembly without metallurgical joints, while at the same time offering mechanical security against individual parts falling out, even if a spacer spring breaks.

With the foregoing and other object in view there is provided, in accordance with the invention, a spacer for centering fuel rods of fuel assemblies in water-cooled nuclear reactors, comprising a grid of sheet metal webs formed of a zirconium alloy and being disposed on edge, rigid bumps formed from at least some of the webs for contacting a fuel rod, at least some of the webs having relatively wide cutouts and relatively narrow lateral slots formed therein, and resilient contact elements formed of chrome nickel steel and having a head part, a base part, a resilient band connecting the head and base parts together into one piece and a bent-out point formed on the resilient band for contacting a fuel rod, the head and base parts of the contact element being insertable into the cutouts and movable into a locked position in the lateral slots formed in the webs.

In accordance with another feature of the invention, the webs having the lateral slots formed therein have enlargements formed therein coextensive with the lateral slots into which the resilient band of the contact elements are snappable for locking.

In accordance with a further feature of the invention, the webs which are free of cutouts and slots are insertable into the webs having the cutouts and slots for locking the contact elements in place and forming a complete spacer grid.

In accordance with a concomitant feature of the invention, the rigid contact bumps are in the form of circular embossings having a high point with a small dimple for contacting a fuel rod.

Other features which are considered as characteristic for the invention are set forth in the appended claims.

Although the invention is illustrated and described herein as embodied in a spacer for fuel assemblies of water-cooled nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 3, 4 and 5 are front elevational, side elevational and top plan views of a contact element;

FIGS. 8, 9 and 10 are top plan, side and developed views of a contact element for the second embodiment; and FIGS. 11 and 12 are views of spacer webs.

Figure 1:
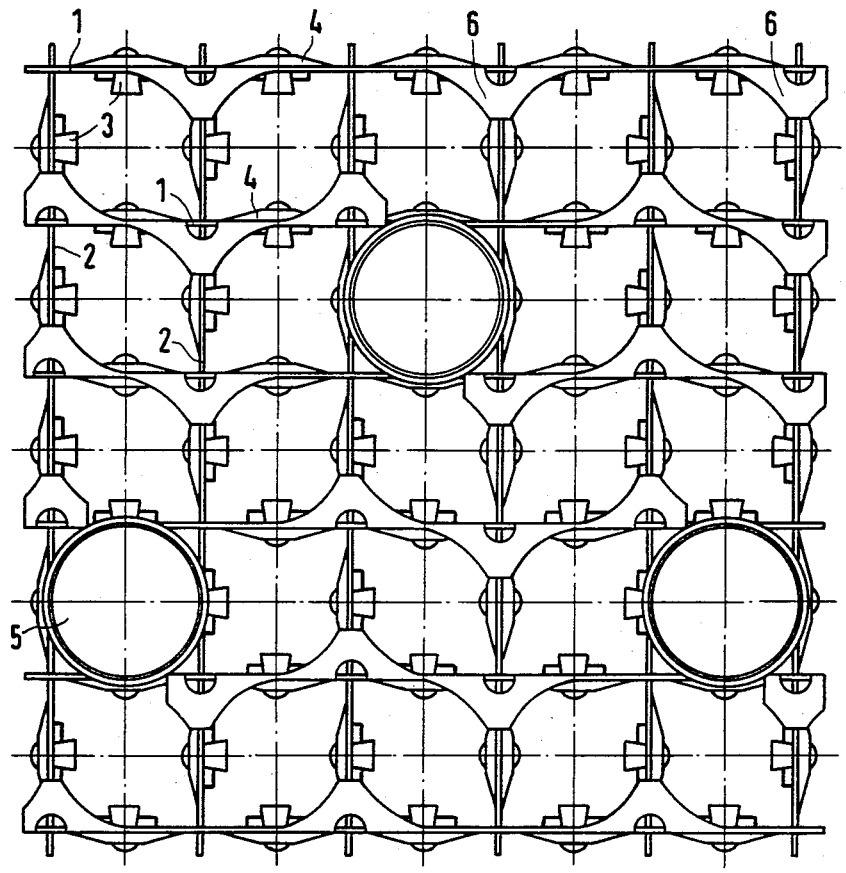
FIG. 1 is a diagrammatic top plan view of a first embodiment of a spacer grid according to the invention.

Referring now to the figures of the drawing, and first particularly to FIG. 1 thereof, there is seen a spacer grid having individual fuel rods centered by resilient contact elements 3 and rigid contact bumps 4 in meshes thereof. Some meshes also contain control rod guide tubes 5. The meshes themselves include nested-together and welded sheet metal web strips 1 and 2 disposed on edge. The strips 1, 2 are provided at least in part with deflection tabs 6, which impart turbulence to the coolant in a manner which is known per se.

The rigid contact bumps 4 are always embossed in the center of the mesh walls and are provided at their highest point with a very small dimple for contact with the fuel rod. This brings about only a very small contact area at the fuel rod and minimizes the impediment of the coolant flow around the fuel rod. In general, these contact bumps 4 are circular but they may also be oval in the flow direction, as seen by the bump 4' in FIG. 12, and therefore contribute to a further reduction of the coolant flow resistance in the spacer mesh.

The resilient contact elements 3 are likewise disposed in the center of the mesh walls, and opposite each resilient contact element are two rigid contact bumps 4 on the opposite mesh wall, so that in this manner a so-called three-point support of the centered fuel rod results.

Figure 2:
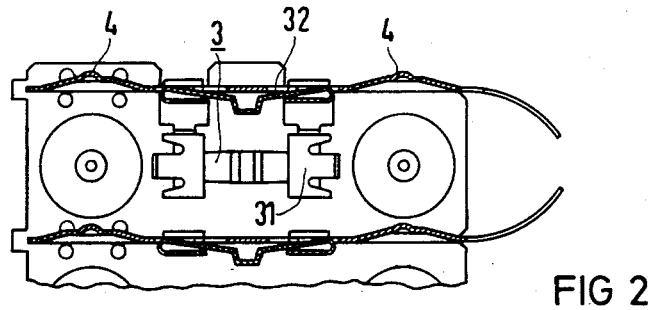
FIG. 2 is a side-elevational view of a spacer grid with a contact element inserted therein.

A side view of such a spacer mesh with a resilient contact element inserted is shown in FIG. 2. The contact element 3 itself can be seen in FIGS. 3, 4 and 5, where FIG. 3 and FIG. 4 shows only the upper half thereof in respective front and side views and FIG. 5 shows a top view. From these figures, the one-piece construction of the contact element 3 can be seen; the resilient part 32 proper is bent from the head and base piece 31 as seen in accordance with FIG. 4. The head piece 31 is angled off on both sides according to FIG. 5 and is provided with a slot 33 at the top and bottom thereof.

Figure 6:
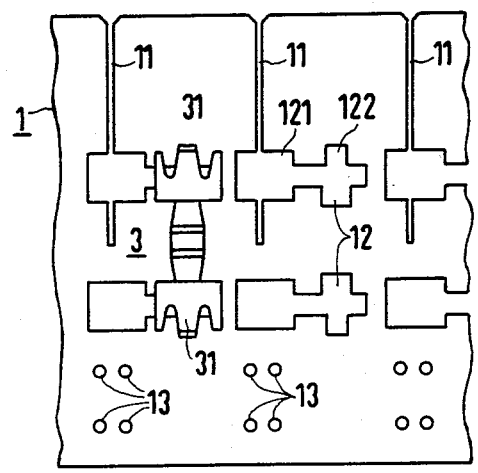
FIG. 6 is a fragmentary diagrammatic side elevational view of a spacer web for assembling grid webs.
Figure 7:
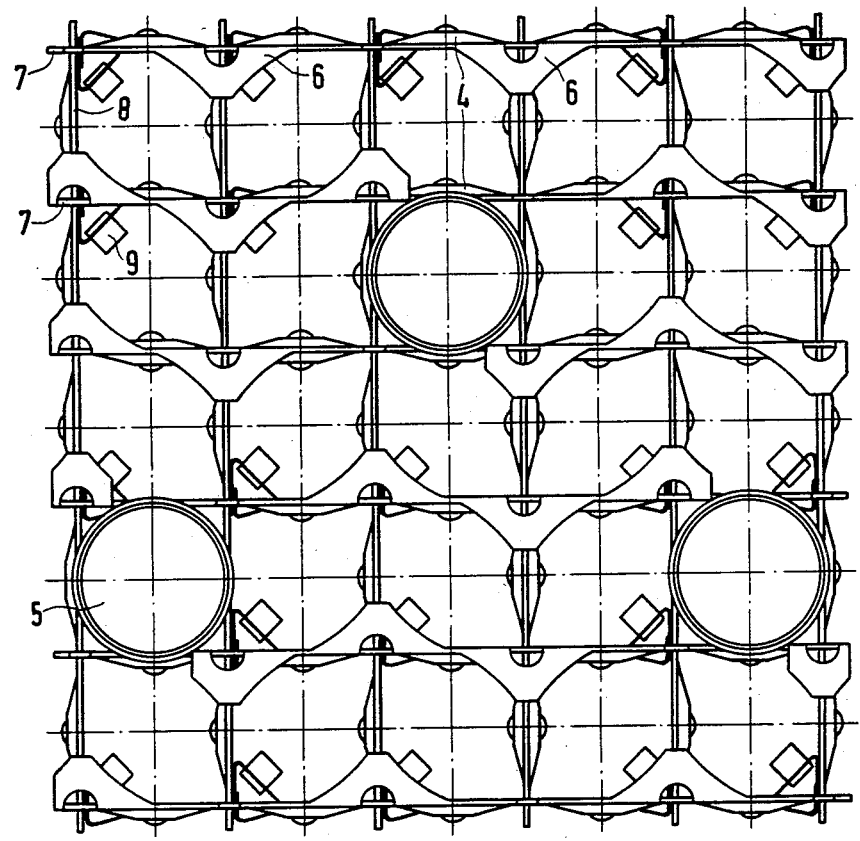
FIG. 7 is a view similar to FIG. 1 of a second embodiment of a spacer grid.

FIG. 6 shows a spacer web 1 with slots 11 formed therein for assembling the grid webs together, and the cutouts 12 for inserting the resilient contact element 3. This cutout 12 which is shown on the right-hand side of FIG. 6 includes an upper part and a lower part for the head and base piece, respectively, of the resilient contact element 3. For assembly, the element 3 is inserted with the head and the base pieces thereof into the cutout 121 and then pushed to the right; then the slots 33 engage the web and eventually the spring or resilient part 32 snaps into the large cutout 122 so that the springy contact element 3 is firmly seated in the center of the spacer mesh wall, as seen in the left-hand side of FIG. 6. This construction ensures that even in the event that the spring 32 breaks, the head and base pieces 31 which are then no longer connected to each other still remain in the assembly of the spacer and cannot be transported in an uncontrolled manner into the cooling system of the nuclear reactor. The dimples or bumps 13 which are embossed from the material of the web strips 1 and are further shown diagramatically in FIG. 6, serve in a known manner for guiding the web strip 2 to be inserted. This can likewise be seen in the side view of FIG. 2 with the springy contact element 3 inserted.

In FIGS. 7 to 12, a second embodiment example is shown. In the second embodiment the resilient contact elements 9 are located in the corners of each spacer mesh according to FIG. 7. The contact elements 9 are likewise constructed from a head and base piece 92 and a spring web 91 connecting them together. The special construction therefor is shown in a top view and a side view in FIGS. 8 and 9; FIG. 10 shows the upper half of the springy contact element 9 in a developed view. The part 92 of this development contains short slots 93 at the top and bottom thereof which are opposite each other according to the bending plan in FIG. 8 as well as the side view in FIG. 9. A metallurgical joint of the ends of the part 92 is not necessary, since the latter is held by itself after insertion into the spacer mesh.

FIG. 11 shows a portion of the spacer web strip 7 with cutouts 72 set off in steps as well as with slots 71 inserting the web strips 8, one of which is shown in part in FIG. 12 next to FIG. 11. The left side of the cutouts 72 is so large that the head and the base piece 92 of the spring elements 9 can be inserted therein, and by moving the spring element 9 to the right, the slots 93 extend over the mesh wall, so that the springy spacer element 9 can no longer be removed perpendicularly to the plane of the web 7. The lateral locking of the resilient spacer elements 9 is brought about by inserting the webs 8. In FIG. 11, a resilient element 9 is shown in dotted lines. The lateral mounting of the element 9 is provided first of all by the right end of the cutouts 72, and further by the sheet metal web strip 8 introduced through the slot 71. The web strip 8 in turn is provided with a slot 81 and is guided laterally by the embossed nipples or bumps 13, as was done in the preceding example.

It is also ensured in this example that the head and base piece 92 remains in the assembly of the web grid, even if the resilient part 9 breaks, which is of considerable importance for the operational safety of the fuel assembly and the nuclear reactor.

Other construction of spacers according to this principle are, of course, also conceivable; a common feature is the mutual mechanical interlock between the web walls formed of a zirconium alloy and the resilient contact elements formed of chrome nickel steel such as Inconel. A further common feature is the interlocking against the loosening of individual parts either by crossed mesh walls if resilient contact elements are disposed in the corners, or by the snapping-in of the resilient parts into corresponding cutouts in the mesh walls. The bending shapes of the resilient contact elements shown in the figures can, of course, also be modified depending on the desired or required spring characteristic. In conclusion, it should also be pointed out that the support of these resilient parts takes place within the mesh walls, so that the axial pressure resulting from the insertion of the fuel rods through deformation of the resilient parts is intercepted by them.

I claim:

1. In a fuel assembly of a water-cooled nuclear reactor, said fuel assembly having fuel rods and spacer grids along said fuel assembly for centering the fuel rods in said assembly, each of said fuel spacers comprising a grid of first and second sheet metal webs formed of a zirconium alloy and being disposed on edge, rigid bumps formed from at least some of said webs for contacting a fuel rod, said first webs having relatively wide cutouts, relatively narrow lateral slots and enlargements of a portion of said slots coextensive with said cutouts and said slots formed therein, wherein each relatively wide cutout is coextensive with and interconnected to one relatively narrow lateral slot, said cutouts, narrow slots and enlargements being positioned in pairs such that each relatively wide cutout has a second relatively wide cutout directly aligned with it in a direction longitudinal to the axis of said fuel assembly and each relatively narrow slot with its enlargements has a second relatively narrow slot with its enlargements directly aligned with it in a direction longitudinal to the axis of said fuel assembly, and resilient contact elements formed of chrome nickel steel and having a head part, a base part, a resilient band connecting said head and base parts together into one piece and a bent-out point formed on said resilient band for contacting a fuel rod, said head and base parts of said contact elements being insertable respectively into a pair of said cutouts and movable from said pair of cutouts into a locked position in said lateral slots formed in said first webs, said resilient bands of said contact elements being snappable into said enlargements of said pair of slots formed in said webs for locking, and said second webs being free of said cutouts and said slots and being insertable into said first webs having said cutouts and slots for retaining said contact elements in place and forming a complete spacer grid.

2. Spacer according to claim 1, wherein said rigid contact bumps are in the form of circular embossings having a high point with a small dimple for contacting a fuel rod.

3. Spacer according to claim 1, wherein said rigid contact bumps are in the form of oval embossings having a high point with a small dimple for contacting a fuel rod.

4. In a fuel assembly of a water-cooled nuclear reactor, said fuel assembly having fuel rods and spacer grids along said fuel assembly for centering the fuel rods in said assembly, each of said fuel spacers comprising a grid of first and second sheet metal webs formed of a zirconium alloy and being disposed on edge, rigid bumps formed from at least some of said webs for contacting a fuel rod, said first webs having relatively wide cutouts and relatively narrow lateral slots coextensive with said cutouts formed therein, wherein each relatively wide cutout is coextensive with an interconnected to one relatively narrow lateral slot, said cutouts and narrow slots being positioned in pairs such that each relatively wide cutout has a second relatively wide cutout directly aligned with it in a direction longitudinal to the axis of said assembly and each relatively narrow slot has a second relatively narrow slot directly aligned with it in a direction longitudinal to the axis of said assembly, and resilient contact elements formed of chrome nickel steel and having a head part, a base part, a resilient band connecting said head and base parts together into one piece and a bent-out point formed on said resilient band for contacting a fuel rod, said head and base parts of said contact elements being insertable respectively into a pair of said cutouts and movable from said pair of cutouts into a locked position in said lateral slots formed in said first webs, and said second webs being free of said cutouts and said slots and being insertable into said first webs having said cutouts and said slots said first webs and said second webs each having means allowing insertion of said second webs into said first webs, said cutouts and said slots being so positioned in said first webs that said second webs will trap said contact elements in said slots of said first webs when said second webs are inserted into said first webs to form a complete spacer grid.

5. Spacer according to claim 4, wherein said rigid contact bumps are in the form of oval embossings having a high point with a small dimple for contacting a fuel rod.

* * * * *